Patented May 31, 1949

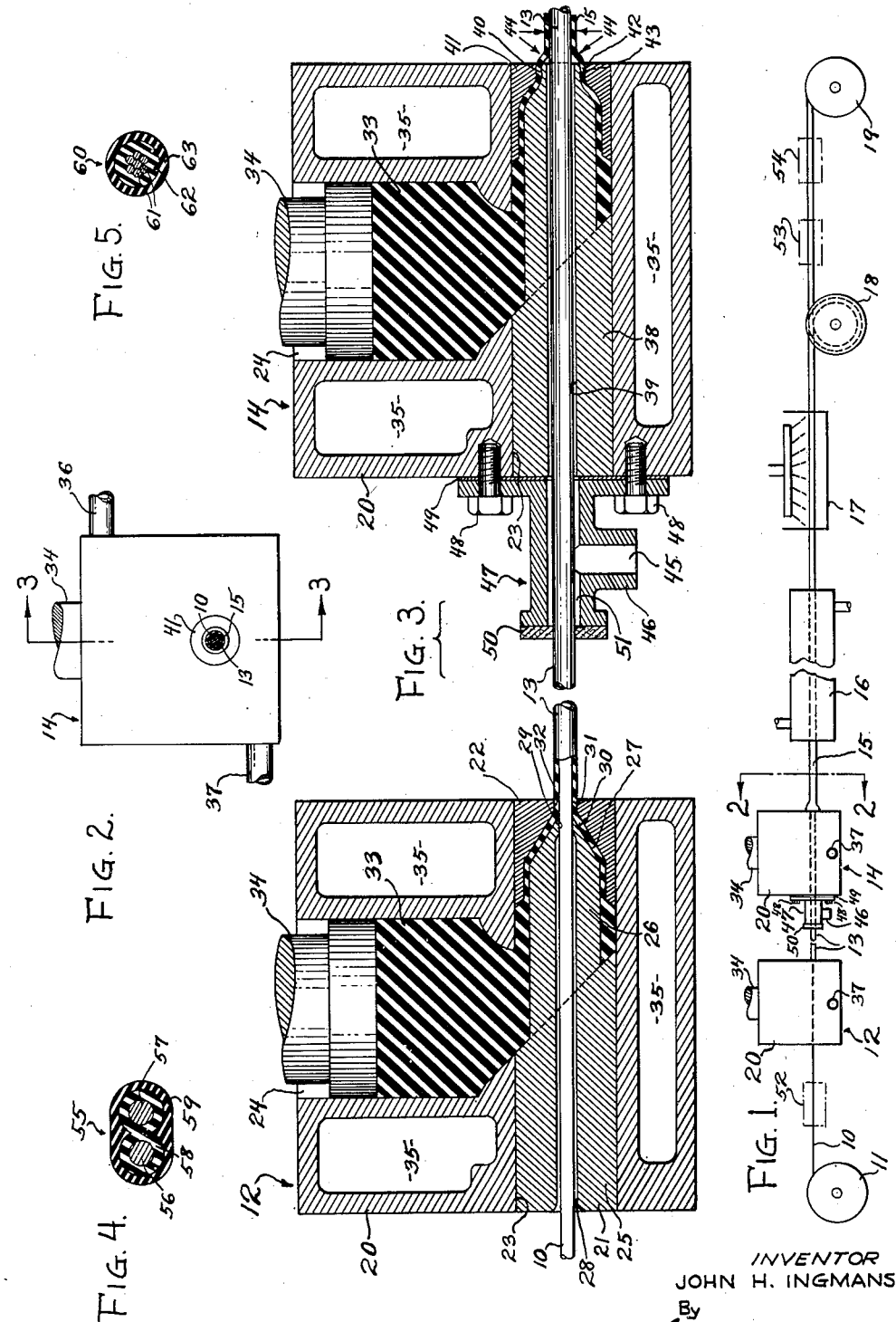

2,471,752

UNITED STATES PATENT OFFICE 2,471,752

PROCESS OF COVERING WIRE CONDUCTORS

John H. Ingmanson, New Haven, Conn., assignor to The Whitney Blake Company, Hamden, Conn., a corporation of Connecticut Application December 22, 1945, Serial No. 636,769

8 Claims. (Cl. 18—59)

This invention relates to improvements in processes of covering wire conductors, and more particularly to processes of covering wire conductors with a plurality of coverings of plastic material.

One object of this invention is to provide an improved process of covering a wire conductor with inner and outer coverings of plastic material.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 1 is a schematic elevational view illustrating one way of carrying out the invention;

Fig. 2 is an enlarged view on line 2—2 of Fig. 1;

Fig. 3 is a still further enlarged view on line 3—3 of Fig. 2;

Fig. 4 is an enlarged cross-sectional view of a different form of wire conductor; and Fig. 5 is a cross-sectional view similar to Fig. 4, of still another form of wire conductor.

Referring to the drawings showing the particular mode of carrying out the invention chosen for illustration therein, the bare wire conductor 10 is illustrated as passing from a pay-off reel 11 through a first extrusion apparatus or tuber 12 where it receives a first or inner extruded insulation covering 13, then passes through a second extrusion apparatus or tuber 14 where it receives a second or outer extruded insulation covering 15, then passes through the usual steam pressure-vulcanizer 16, then passes through one or more usual water-cooling devices 17, then reaches a capstan 18 which furnishes the power for pulling the wire conductor with its coverings through the hereinbefore-described apparatus, and then passes to the take-up reel 19 where it is wound up in final form.

The extrusion apparatus 12 includes a body-member 20, a mandrel or core-tube member 21 and a die-member 22. The body-member 20 is formed with a tool-receiving passage 23 extending therethrough from end to end, and is formed in its upper portion with a charge-chamber 24, the contracted lower portion of which communicates with the intermediate portion of the passage 23. The passage 23 receives the rear portion 25 of the core-tube member 21 with a snug fit. The forward portion of the core-tube 25 is reduced in diameter to form a mandrel-nose 26 having its main diameter materially less than the diameter of the passage 23 and having its extreme forward end 27 tapered, and having the diameter of its center passage 28 reduced at 29 to just properly guide the wire 10 in its passage therethrough.

The die-member 22 snugly fits within the forward portion of the tool-receiving passage 23 and has its interior surface spaced from the exterior surface of the adjacent portion of the mandrel-nose 26 in such manner as to provide a tubular extrusion-passage 30. The forward end 31 of the extrusion-passage is of cylindrical form and is formed or provided between the inner cylindrical surface 32 of the die-member 22 and the outer surface of the wire 10 and concentric therewith, to provide for the formation of the extruded inner covering 13 when pressure is applied to the plastic mass 33 by means of a ram 34. A heating-chamber 35 may be heated by means of steam, hot oil, or other desired heating medium, which may be caused to circulate through the heating-chamber 35 by means of the inlet- and outlet-pipes 36 and 37, in order to maintain the mass of plastic insulation material 33 in sufficiently soft plastic condition for proper extruding condition, as is well known to those skilled in the art.

The second extrusion apparatus or tuber 14 is of essentially the same construction as concerns parts numbered 20, 23, 24, 33, 34, 35, 36 and 37 which have been described in connection with the extrusion apparatus or tuber 12. The mandrel-member 38 has the entire length of its center passage 39 of the same diameter and spaced away from the first or inner extruded covering 13 on the wire 10, and with its forward outer surface 40 formed cylindrical to thus constitute an inner die-member or die-portion adapted to cooperatively act with the outer die-member 41 to form a cylindrical end-passage 42 through which the plastic mass 33 is extruded initially into a cylindrical tube 43 spaced away from the inner covering 13, and which is subsequently contracted to smaller size into contact with the traveling inner covering 13 by means of fluid pressure by the air acting as indicated by the arrows 44, as will presently be explained.

In the particular construction illustrated, the fluid pressure which contracts the outer tubular covering into contact with the inner covering, is accomplished by means of a vacuum-pump (not shown) which produces suction in the passage 45 of the branch-pipe 46 which extends laterally from the suction-head 47 which is clamped against the rear face of the body-member 20 by bolts 48 or other suitable means, with an apertured gasket 49 between the suction-head 47 and the body-member 20. An apertured resilient gasket 50 closely fits the periphery of the wire 10 to prevent or retard the leakage of air into the interior of the suction-passage 51 of the suction-head 47. It will be appreciated, of course, that the fluid pressure at the location indicated by the arrows 44 could be accomplished by a positive above-atmospheric-pressure, of air or other fluid at this location, instead of accomplishing it by the vacuum method hereinbefore described. The degree of vacuum employed will vary with a number of variable factors such as the ease of plastic flow of the particular plastic material 33 being employed, the speed of travel of the wire 10, etc., though generally speaking, only a moderate degree of a partial vacuum is necessary. As the wire 10 with its inner covering 13 travels onward, the extruded-temporarily-formed large outer tube 43 is contracted by the fluid pressure as previously described, to form the outer tubular insulation covering 15 in close contact all around with the inner insulation covering 13.

Additional devices may be employed, such as a usual wire straightener 52, a wire-measuring device 53 and an electric insulation-tester 54.

Instead of covering the single wire 10 illustrated in Figs. 1, 2 and 3, any other wire conductor may be covered as, for example, the wire conductor 55 illustrated in Fig. 4, and which includes two spaced-apart wires 56 and 57 which are covered with the inner covering 58 and the outer covering 59.

Another form of wire conductor 60 is illustrated in Fig. 5 as having a plurality of wires 61 which may be twisted into a cable, and covered with the inner covering 62 and the outer covering 63.

The inner covering is preferably formed of vulcanizable plastic material which may, for example, be natural rubber, or synthetic rubber such for example as Buna-S or butyl rubber. The outer covering may be formed of thermosetting plastic material or thermoplastic plastic material. Examples of thermosetting materials are the vulcanizable materials natural rubber, and synthetic rubber such for example as neoprene, Buna-N and Buna-S. One of the possible thermoplastic materials which may be employed is nylon.

The process disclosed in accordance with the present invention of applying both the inner and outer coverings prior to vulcanization of the inner covering, secures the important advantage of not having to apply any material such for example as tricresyl phosphate to the exterior surface of the inner covering if it were vulcanized before application of the outer covering, in order to render the inner covering sufficiently adhesive to bring about good adhesion between the inner and outer coverings.

The causing of the outer plastic covering to closely engage the inner plastic covering is brought about in the present disclosure by means of the air pressure on the outer covering resulting from the vacuum process applied. This contracting or closing in of the tubular outer covering also is aided by the wire 10 with its inner covering traveling faster than the rate of extrusion of the enlarged tube which is to become the outer covering, inasmuch as the higher speed of travel of the wire and its inner cover results in a pulling action which, even without the aid of external fluid pressure, would contract the outer tubular covering into engagement with the inner covering.

Extruding the first or inner covering into pressure contact against the wire minimizes the likelihood of defects such as small holes or breaks in the insulation, which might result if the extruded material were under tension as it moved into engagement against the wire, which breaks would seriously damage the electrical insulation qualities of the inner covering. And extruding the outer covering in tubular form spaced away from the inner covering and contracting into contact with the inner covering, minimizes damage to the relatively soft inner covering, and permits of obtaining more uniform thickness of the outer covering.

For convenience, the terms "inner covering" and "outer covering" have been used in the specification and claims, but it is not intended to imply that these coverings are necessarily the innermost or the outermost coverings that may be applied as insulation on the wire conductor, but only to imply that the inner covering is relatively-inner as compared with the outer covering, and the outer covering is relatively-outer as compared with the inner covering. The statement that the inner covering is extruded into pressure-contact against the traveling conductor, does not necessarily mean that it is extruded into direct contact against the wire of the conductor. Obviously it might be extruded into pressure-contact against a thin covering over the wire.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The process of covering a wire conductor with inner and outer coverings of plastic material, including: causing a wire conductor to travel longitudinally; extruding substantially uniformly over said traveling conductor, an inner deformable covering of vulcanizable plastic material; extruding through a die over said traveling inner covering while it is in unvulcanized deformable condition, an outer covering of different plastic material, said outer covering being extruded from said die in the form of a tubular sheath around said inner deformable covering with a space annular in cross section therebetween so as to exert no pressure on said traveling inner deformable covering while the latter is within the die; contracting said tubular sheath after it has passed out of said die substantially uniformly to smaller size into contact with said traveling inner deformable covering thereby to maintain the uniformity of said inner deformable covering over said wire conductor; and heating said inner covering of vulcanizable material to temperature to vulcanize it while it is covered by and traveling with said outer covering.

2. The process of covering a wire conductor with inner and outer coverings of plastic material, including: causing a wire conductor to travel longitudinally; extruding substantially uniformly over said traveling conductor, an inner deformable covering of vulcanizable plastic material; extruding through a die over said traveling inner covering while it is in unvulcanized deformable condition, an outer covering of different plastic material, said outer covering being extruded from said die in the form of a tubular sheath around said inner deformable covering with a space annular in cross section therebetween so as to exert no pressure on said traveling inner deformable covering while the latter is within the die; contracting said tubular sheath after it has passed out of said die substantially uniformly to smaller size into contact with said traveling inner deformable covering at least in part by fluid pressure caused to be applied against the outer surface of said extruded outer deformable covering thereby to maintain the uniformity of said inner deformable covering over said wire conductor; and heating said inner covering of vulcanizable material to temperature to vulcanize it while it is covered by and traveling with said outer covering.

3. The process of covering a wire conductor with inner and outer coverings of plastic material, including: causing a wire conductor to travel longitudinally; extruding substantially uniformly over and into pressure contact against said traveling conductor, an inner deformable covering of different plastic material; extruding through a die over said traveling inner deformable covering, an outer covering of different plastic material extruded from said die in the form of a tubular sheath around said inner covering with a space annular in cross section therebetween so as to exert no pressure on said traveling inner deformable covering while the latter is within the die and at longitudinal speed-of-extrusion less than the speed of travel of said conductor and said inner deformable covering; and contracting said tubular sheath after it has passed out of said die substantially uniformly to smaller size into contact with said traveling inner deformable covering thereby to maintain the uniformity of said inner deformable covering over said wire conductor.

4. The process of covering a wire conductor with inner and outer coverings of plastic material, including: causing a wire conductor to travel longitudinally; extruding substantially uniformly over and into pressure contact against said traveling conductor, an inner deformable covering of plastic material; extruding through a die over said traveling inner deformable covering, an outer covering of different plastic material extruded from said die in the form of a tubular sheath around said inner deformable covering with a space annular in cross section therebetween so as to exert no pressure on said traveling inner deformable covering while the latter is within the die and at longitudinal speed-of-extrusion less than the speed of travel of said conductor and said inner deformable covering; and contracting said tubular sheath after it has passed out of said die substantially uniformly to smaller size into contact with said traveling inner deformable covering at least in part by fluid pressure caused to be applied against the outer surface of said extruded outer covering thereby to maintain the uniformity of said inner deformable covering over said wire conductor.

5. The process of covering a wire conductor with inner and outer coverings of plastic material, including: causing a wire conductor to travel longitudinally; extruding substantially uniformly over and into pressure contact against said traveling conductor, an inner deformable covering of vulcanizable plastic material; extruding through a die over said traveling inner covering while it is in unvulcanized deformable condition, an outer covering of different plastic material extruded from said die in the form of a tubular sheath around said inner deformable covering with a space annular in cross section therebetween so as to exert no pressure on said traveling inner deformable covering while the latter is within the die and at longitudinal speed-of-extrusion less than the speed of travel of said conductor and said inner deformable covering; and contracting said tubular sheath after it has passed out of said die substantially uniformly to smaller size into contact with said traveling inner deformable covering thereby to maintain the uniformity of said inner deformable covering over said wire conductor; and heating said inner deformable covering of vulcanizable material to temperature to vulcanize it while it is covered by and traveling with said outer covering.

6. The process of covering a wire conductor with inner and outer coverings of plastic material, including: causing a wire conductor to travel longitudinally; extruding substantially uniformly over and into pressure contact against said traveling conductor, an inner deformable covering of vulcanizable plastic material; extruding through a die over said traveling inner covering while it is in unvulcanized deformable condition, an outer covering of different plastic material extruded from said die in the form of a tubular sheath around said inner covering with a space annular in cross section therebetween so as to exert no pressure on said traveling inner deformable covering while the latter is within the die and at longitudinal speed-of-extrusion less than the speed of travel of said conductor and said inner deformable covering; and contracting said tubular sheath after it has passed out of said die substantially uniformly to smaller size into contact with said traveling inner deformable covering at least in part by fluid pressure caused to be applied against the outer surface of said extruded outer covering thereby to maintain the uniformity of said inner deformable covering over said wire conductor; and heating said inner deformable covering of vulcanizable material to temperature to vulcanize it while it is covered by and traveling with said outer covering.

7. The process of covering a wire conductor with inner and outer coverings of plastic material, including: causing a wire conductor to travel longitudinally; extruding substantially uniformly over said traveling conductor, an inner deformable covering of plastic material; and extruding through a die over said traveling inner deformable covering, an outer covering of different plastic material, said outer covering being extruded from said die in the form of a tubular sheath around said inner deformable covering with a space annular in cross section therebetween so as to exert no pressure on said traveling inner deformable covering while the latter is within the die, and contracting said tubular sheath after it has passed out of said die substantially uniformly into contact with said traveling inner covering thereby to maintain the uniformity of said inner deformable covering over said wire conductor.

8. The process of covering a wire conductor with inner and outer coverings of plastic material, including: causing a wire conductor to travel longitudinally; extruding substantially uniformly over said traveling conductor, an inner deformable covering of vulcanizable plastic material;

extruding through a die over said traveling inner covering while it is in unvulcanized deformable condition, an outer covering of different vulcanizable plastic material, said outer covering being extruded from said die in the form of a tubular sheath around said inner deformable covering with a space annular in cross section therebetween so as to exert no pressure on said traveling inner deformable covering while the latter is within the die; contracting said tubular sheath after it has passed out of said die substantially uniformly into contact with said traveling inner deformable covering; and heating said traveling coverings of vulcanizable materials to temperature to vulcanize them while they are traveling together.

JOHN H. INGMANSON.

REFERENCES CITED

The following references are of record in the file of this patent:

UNITED STATES PATENTS

| Number | Name | Date |
|---|---|---|
| 876,755 | Webb | Jan. 14, 1908 |
| 1,419,090 | Williams | June 6, 1922 |
| 1,681,566 | Anderegg | Aug. 21, 1928 |
| 1,992,678 | Studt | Feb. 26, 1935 |
| 2,218,138 | Stricklen | Oct. 15, 1940 |
| 2,291,670 | Wiley et al. | Aug. 4, 1942 |